United States Patent

[11] 3,620,485

| [72] | Inventor | Egon Gelhard Mehlemer Strasse 28, 5 Cologne-Marienburg, Germany |
|---|---|---|
| [21] | Appl. No. | 772,272 |
| [22] | Filed | Oct. 31, 1968 |
| [45] | Patented | Nov. 16, 1971 |
| [32] | Priority | Oct. 31, 1967 |
| [33] | | Germany |
| [31] | | P 15 31 351.6 |

[54] DIRIGIBLE
15 Claims, 17 Drawing Figs.

[52] U.S. Cl. ................................................. 244/29,
244/97, 244/125, 244/126, 244/128, 244/130
[51] Int. Cl. ............................................... B64b 1/06
[50] Field of Search .......................................... 244/128,
29, 30, 125, 126, 96, 99, 42.41, 42.47, 42.48, 130

[56] References Cited
UNITED STATES PATENTS

| 1,390,745 | 9/1921 | Armstrong | 244/30 |
|---|---|---|---|
| 1,457,024 | 5/1923 | Franzen | 244/29 |
| 1,580,182 | 4/1926 | Van Valkenberg | 244/125 |
| 1,641,324 | 9/1927 | D'Humy | 244/125 |
| 1,788,595 | 1/1931 | Ross | 244/125 |
| 1,824,453 | 9/1931 | Warth | 244/30 |
| 2,197,568 | 4/1940 | Donnell | 244/125 |
| 2,275,771 | 3/1942 | Kimbel | 244/125 |
| 2,396,494 | 3/1946 | Donnell et al. | 244/30 |
| 3,185,411 | 5/1965 | Gembe | 244/30 |
| 3,473,761 | 10/1969 | Chutter | 244/119 |
| 1,778,273 | 10/1930 | Park et al. | 244/29 |
| 2,508,288 | 5/1950 | Owner et al. | 244/42 (.47) |
| 2,969,759 | 1/1961 | Giles | 244/130 |
| 3,180,589 | 4/1965 | Fitzpatrick | 244/30 |
| 3,410,510 | 11/1968 | Papst | 244/130 |

*Primary Examiner*—Milton Buchler
*Assistant Examiner*—Steven W. Weinrieb
*Attorney*—Woodhams, Blanchard and Flynn ABSTRACT: A lighter-than-air aircraft having a central passageway longitudinal of the aircraft and a plurality of passageways radiating laterally therefrom. Suitable air moving means are located in said passageways near the forward end of the aircraft for drawing air into said passageways through the forward end thereof and supplying same under pressure to the rearward portion of said central passageway and to said radiating passageways. Suitable independently operated valving means on all of said passageways permit opening and closing of said selected ones thereof whereby said aircraft may be caused to move forwardly or stand still and may be further caused to move upwardly, downwardly or sidewardly. Reversing of said air moving means moves said aircraft rearwardly. Lifting gas is provided in a plurality of independent compartments, same being divided by a flexible diaphragm with lifting gas in one portion thereof and air in the other portion. By varying the proportion of air and lifting gas in selected ones or all of said compartments, the lift of the aircraft may be suitably adjusted or same may be trimmed.

INVENTOR.
EGON GELHARD

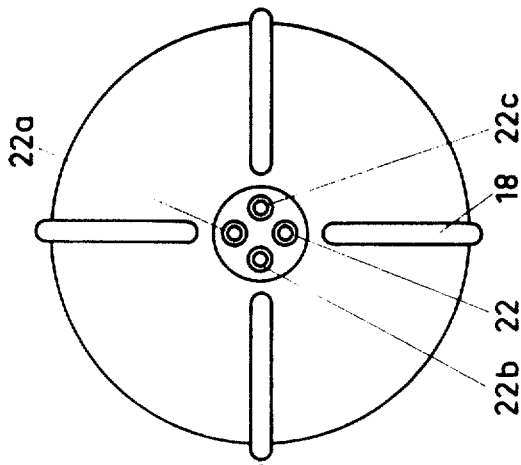
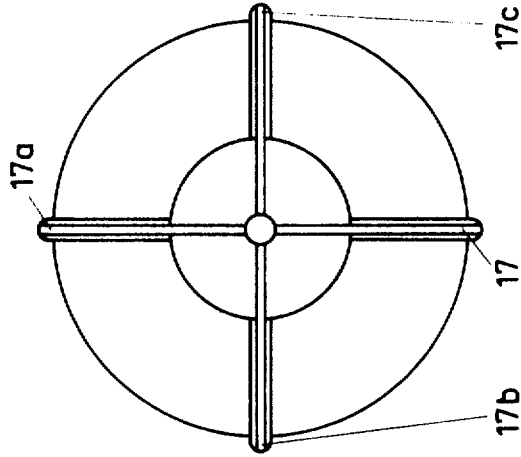
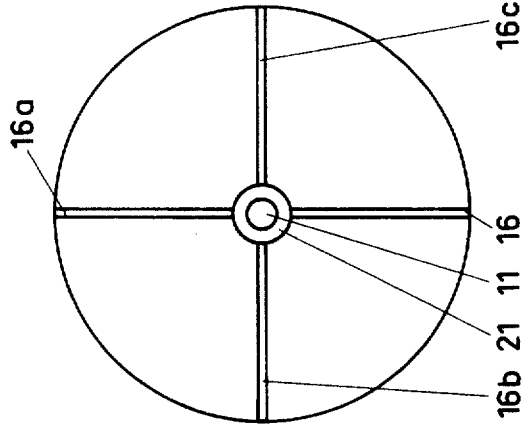

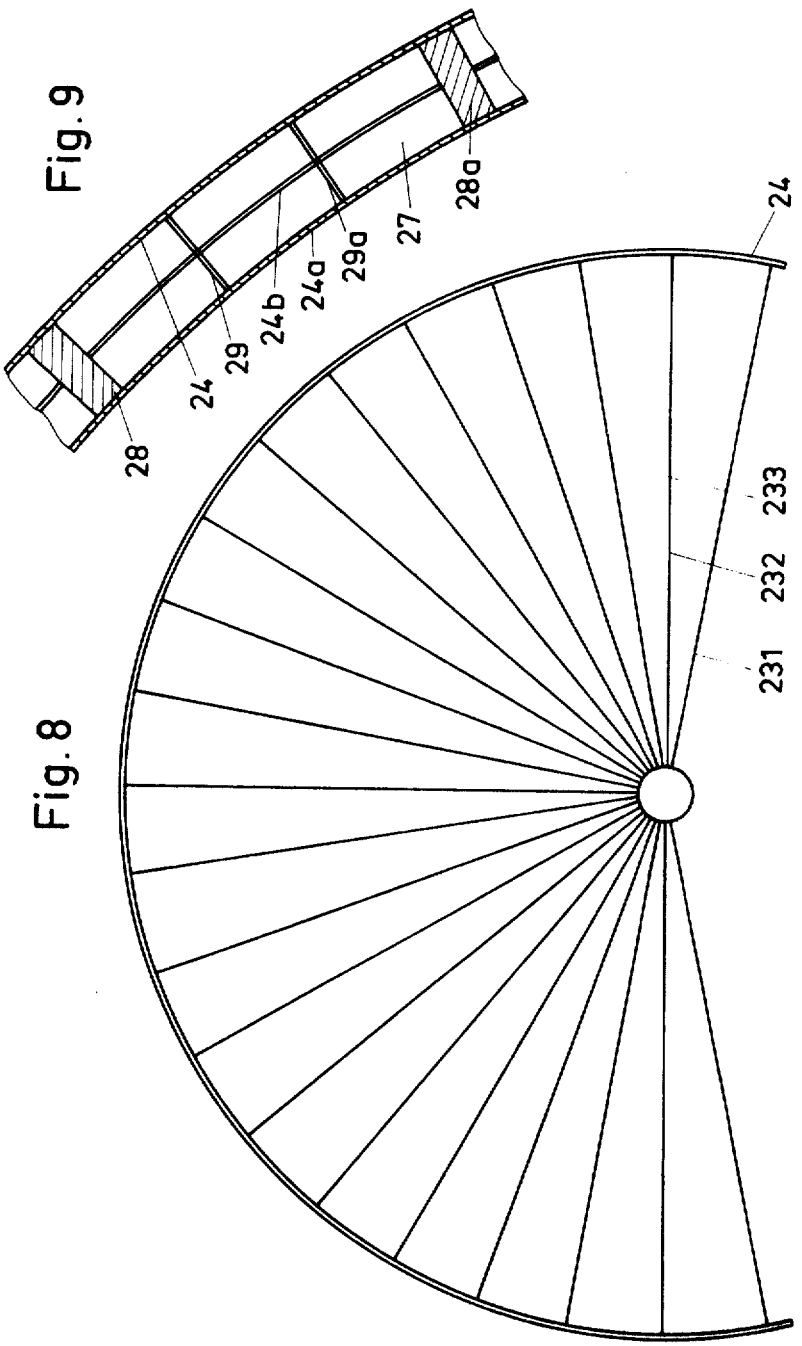

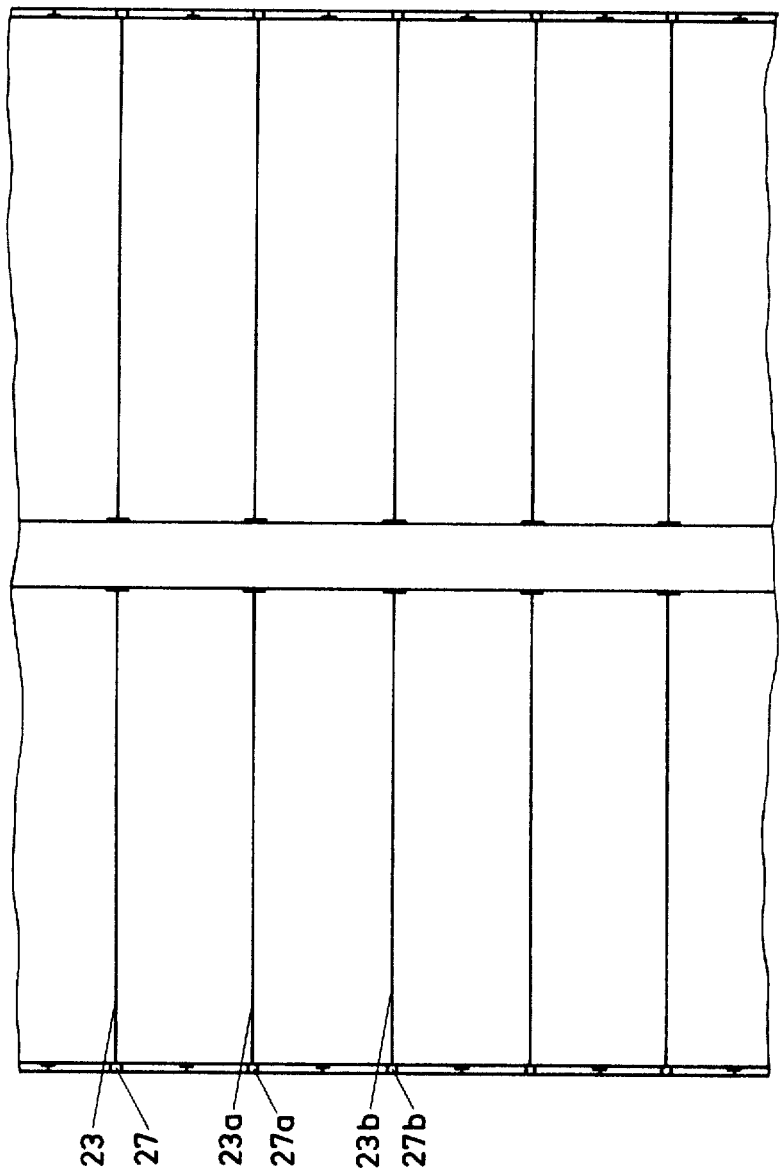

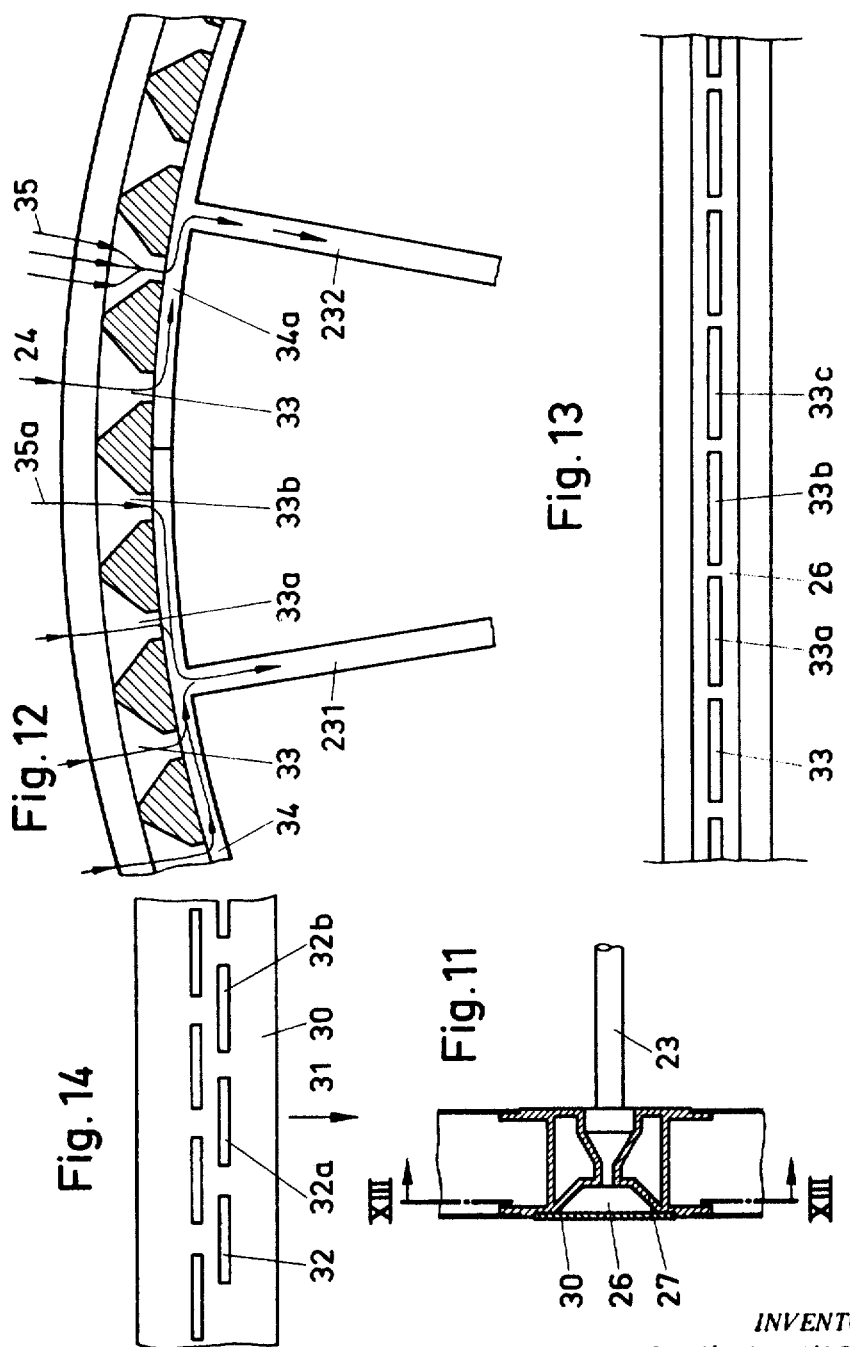

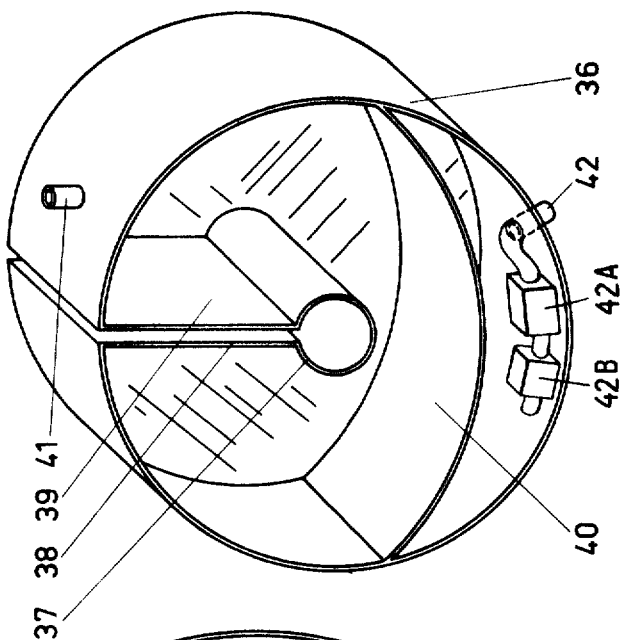
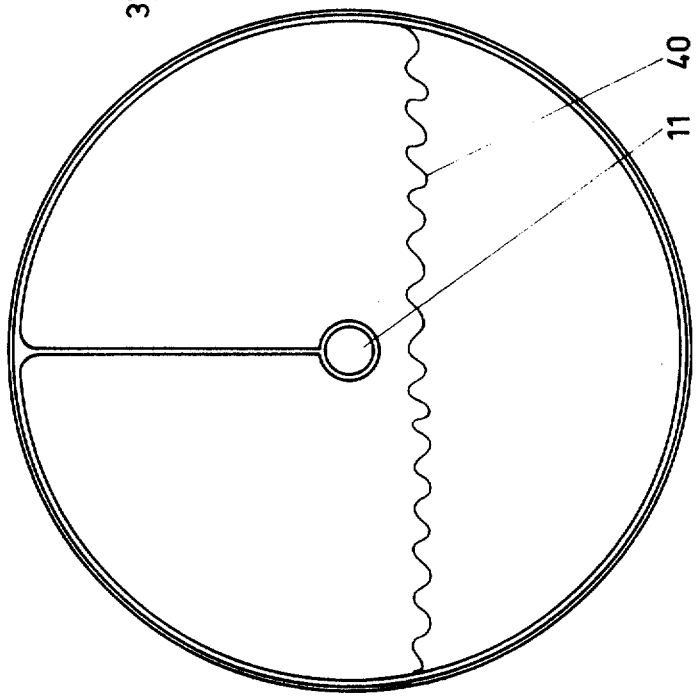
INVENTOR.
EGON GELHARD

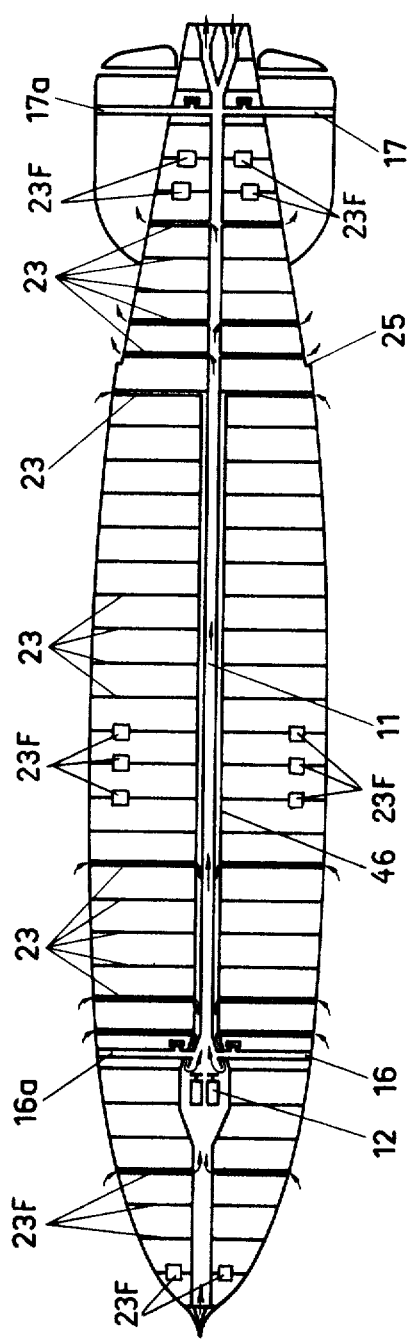

DIRIGIBLE

This invention relates to a dirigible, namely, a rigid aircraft which is driven by a lighter-than-air gas stored in the dirigible.

Statistics on the use of various types of means of transportation have shown that a dirigible is the safest means of transportation. In spite of this, dirigibles are no longer in use today.

Former dirigibles, particularly those which were filled with helium gas, were, as mentioned above, very safe. However, maneuvering of those dirigibles presented difficulties. Also a large number of personnel as ground crew were required during starting and landing of the dirigible.

The basic purpose of the invention is to use the advantages which a dirigible has with respect to safety and moreover to produce a dirigible which is fully maneuverable both during flight and also during a standstill in the air and which, with respect to economy, is superior to other aircraft and does not require a ground crew. The dirigible which does not require runways like airplanes is suitable for both short-distance and long-distance traffic. Furthermore, a considerable speed can be developed by the dirigible.

To attain this purpose, the invention provides that a number of spaced-apart blast nozzles which open to the outside are provided on the body of the dirigible, which blast nozzles are connected with at least one pressure air or pressure gas and can be operated selectively independently from one another.

The blast nozzles in an arrangement as disclosed above allow the dirigible of the invention to be maneuvered into a desired flying position in the air and also allow the entire dirigible to be moved, as desired, upwardly, downwardly or sidewardly. Any desired movement or any desired change in position can be achieved by operating one or several blast nozzles which then urge the dirigible into the desired position or direction by means of the jet reaction. Since the effect of the blast nozzles is practically immediate, the blast nozzles can, for example, also be used for a quick trimming of the flying position of the dirigible if shifts in weight occur in said dirigible during the flight which, for example, could be due to movements of the passengers. The landing of the dirigible is also possible by means of the blast nozzles without requiring ground crews to hold the dirigible by ropes near the ground and to pull the dirigible to the ground. The large amount of landing devices and working forces which were required for the previously known dirigibles thus is not needed and an economical operation is assured for the dirigible of the invention.

A simple construction of the dirigible of the invention with one arrangement of the blast nozzles which is particularly advantageous for the maneuverability is provided by arranging several blast nozzles over the periphery of the skin of the dirigible in a plane which extends perpendicularly to the longitudinal axis of the dirigible both in the front portion of the dirigible and also in the rear portion of the dirigible. This arrangement of the nozzles allows inclination movements of the dirigible about an ideal horizontal axis which extends transversely to the longitudinal axis and also translation movements in vertical and horizontal direction which extends transversely to the longitudinal axis of the dirigible and also allows pivotal motions about a vertical axis.

A particularly advantageous arrangement is obtained by providing four blast nozzles in each one of two planes which extend perpendicularly to the longitudinal axis of the dirigible, which blast nozzles are directed upwardly or downwardly or horizontally to the one side or the other side.

The dirigible of the invention is advantageously constructed by connecting the blast nozzles to the outer ends of air passages which are arranged inside the dirigible and open to the outside at the outer skin. It is advantageous to connect the air passages, directly or indirectly, to at least one compressor which draws in air from the outside atmosphere. The air which is expelled through the blast nozzles is, in this embodiment, drawn in from the surrounding atmosphere of the dirigible and need not be taken along in pressure containers.

An advantageous feature is also that each air passage is independent of other air passages and can be closed selectively entirely or partially by means of a built-in control flap. In this manner, it is possible for a single blast nozzle to be operated separately even though they are connected to a single pressure air source.

A particularly advantageous construction is that each air passage has its own compressor associated therewith which can be turned on and off independently of the other compressors. Each blast nozzle in this embodiment is completely independent from the other nozzles also as to its pressure air source.

A simple construction is obtained by connecting blast control nozzles at the outer ends of radially directed air passages which latter are arranged in the afterpart of the dirigible in the zone of the tail unit and are guided by the stabilizers.

Furthermore, it is advantageous if radially directed passages with blast control nozzles provided at their ends are provided in the front zone of the dirigible, for example, in the first third thereof.

The dirigible of the invention is particularly advantageously constructed with a drive passageway provided in the center longitudinal axis of the dirigible and extending from the nose to the tail, at least one drive mechanism being arranged in the drive passageway, the drive mechanism drawing in air from the nose of the dirigible and expelling same as compressed air at the tail, or at times in reversed manner, and that the air passages radially arranged in the body of the dirigible and provided with blast control nozzles at their outer ends are connected to the drive passageway at their inner ends.

This construction of the dirigible of the invention has first the advantage that the pressure resistance at the nose of the dirigible is reduced at approximately 60 to 70 percent by drawing air into the drive passageway. The air which is drawn in at the front is used, after being compressed and accelerated, for movement of the dirigible by expelling same at the tail of the dirigible. This makes the dirigible a sort of a jet dirigible. Through the provision of radially directed air passages which have blast control nozzles at their outer ends and which open out into the outside atmosphere branch off the drive passageway, a full maneuverability of the dirigible is obtained even when same does not have a forward speed but instead stands in the air so that there is no air current acting against its tail units. Since the four radially extending air passages with blast nozzles which are preferably arranged in the front zone of the dirigible and the corresponding air passages with blast nozzles which are preferably arranged in the rear zone of the dirigible, are all preferably positioned at tight angles to one another, a maneuvering of the dirigible about all three axes (namely, the longitudinal axis, the vertical axis and the transverse axis) can be done through suitable operating of the air-outlet nozzles. All types of drive me front coupled with air impellers can be provided. For example, jet units can be provided or also turbine or piston motors which drive propeller or axial compressors.

Means may also be utilized to provide a reversing force, for example, to make the drive reversible through reversible propellers, to effect a reverse flight. The vertically directed control nozzles in the first third of the dirigible and at the tail permit, independent of the weight of the dirigible, any desired raising or lowering of the dirigible. This is of a particular importance during takeoff and landing. The control nozzles can thereby at the same time also be used for a temporary or continuous trimming of the dirigible.

According to a further characteristic of the invention it is suggested that the drive passageway which is arranged in the longitudinal axis of the dirigible has, in the common direction of flight of the dirigible, a large cross section in front of the drive mechanisms and in the zone behind the drive mechanisms a smaller cross section, that the drive mechanism or mechanisms is or are arranged within an enlargement of the drive passageway and that each drive mechanism has its own air impeller, for example, a propeller or an axial compressor.

In a particularly advantageous embodiment of the dirigible of the invention, the drive passageway is constructed as the supporting part of the dirigible and consists advantageously of shielded, particularly glass fiber-shielded, plastic and a plurality of equally spaced, radially projecting hollow struts, particularly made of glass fiber-shielded plastic, are arranged on and extend around a hollow center support, whereby said radially projecting hollow struts are suitably arranged on successive radial planes and are provided in large numbers suitably, usually equally, spaced along the length of the center support. The outer ends of said struts are connected with a skin forming the outer contour of the dirigible, which skin may be constructed of two or multiple shells and is provided with multiple longitudinal supports and circumferential frames, said circumferential frames lying in the radial planes of the struts.

The center longitudinal hollow support of the dirigible has a high strength not only due to its tube-shaped construction but this passage is at the same time a drive passageway for the pressure air which is used to drive the dirigible.

To obtain a particularly favorable airflow around the dirigible it is advantageous to construct the dirigible of the invention with the hollow struts opening at their outer ends to the outside atmosphere, those hollow struts which are provided in the front and center zones of the dirigible connecting for smooth airflow with their inner ends to a suction port which guides to a suction inlet of the air impeller coupled with the drive mechanism, and with those hollow struts which are provided in the tail zone of the dirigible also connecting for smooth airflow at their inner ends to the drive passageway arranged in the center longitudinal axis of the dirigible. A particularly desirable construction through which also the rigidity of the center drive tube is increased with the suction port with which a part of the hollow struts are connected is constructed as a conduit which is arranged and extends concentrically to the drive passageway. The hollow struts which are connected to the suction port are thereby not only used as supporting elements but are used as air-conducting passages for drawing in layers of air from the outer skin of the dirigible. The hollow struts thus act as suction lines. This drawing in of air layers or boundary layer air from the outer skin of the dirigible reduces the frictional resistance considerably so that the required drive energy for operating the dirigible is reduced correspondingly. This removal of air layers takes place in the zone over most of the length of the dirigible while adjacent the tail of the dirigible, as will be described hereinafter, there occurs a discharge of air at the outer surface rather than an intake thereof. In the rear zone of the dirigible, the hollow struts are directly connected to the center drive passageway. A portion of the air flowing to the rear through the drive passageway flows to the outside through the hollow struts which are thereby used as blast conduits, and is expelled at the outer periphery of the dirigible in the zone of the tail. The blast ports can preferably be arranged in such a manner that the blast has at least one rearwardly directed flow component. Through this discharge of air in the tail zone of the dirigible, the dead zone directly behind the dirigible is reduced and thus the flow resistance is reduced.

Thus, a material reduction of flow resistance is obtained, partly through the drawing in of air at the outer skin of the dirigible in its front zone and partly through the discharging of air at the outer skin of the dirigible in its tail area. Furthermore, the flow resistance can be further reduced by making the outer skin as smooth as possible. For example, it is possible to make the outer skin of plastic (as a polyester).

The drawing in of boundary layers for reducing the friction over most of the outer surface of the dirigible makes it now possible in connection with the drawing in of air at the nose of the dirigible for the purpose of driving the dirigible to operate a dirigible with a comparatively small expenditure of energy. Thus, a dirigible having a length of 280 meters has a tare weight of 100 tons and a useful load of 110 tons, of which 50 ton loads are provided for the propellant for driving at a speed of approximately 300 km./h. with only an output of the drive mechanism of approximately 10,000 PS at a developed power of approximately 14,000 PS. This minimum expenditure of power can hardly be compared with the expenditures of airplanes, in particular jet airplanes and helicopters.

According to a further feature of the invention, it is suggested that the hollow struts are connected with the circumferential frames and said latter are provided with a groove-shaped recess extending around the entire or most of the outer surface. According to such further embodiment, the circumferential frames are provided externally with annular grooves and a plurality of tapered openings extend from such grooves into a header to which the hollow struts are connected. Such header extends over a section corresponding to the distance between the struts. According to a further characteristic of the invention the hollow struts open into the center of the headers which extend over one section in such a manner that the tapered openings have a small cross section at the point of opening into the header in the area near the strut and a greater cross section with an increasing distance from the strut. According to a further characteristic of the invention, it is suggested that the outer groove-shaped recesses extending around the circumferential frames are covered by a perforated cover means. The perforations in the cover consist according to a further characteristic of the invention of at least one row, advantageously two rows, of elongated openings, each arranged transverse to the longitudinal axis of the dirigible. If two rows of elongated openings are utilized, same are arranged offset to one another.

According to a further feature of the invention, it is suggested that the air passageways originating at the drive passageway and used for steering the dirigible are provided additionally with auxiliary drive mechanisms which drive compressors, for example, propellers or axial compressors.

According to a still further feature of the invention, it is suggested that in a zone shortly before the tail unit there is provided a stepped reduction in the diameter of the dirigible as a flow-interrupting edge. Such reduction in diameter can at this point be, for example, approximately 2.75 percent of the larger diameter. Seen in the direction of flight, the body after the stepped tapering can have a truncated conical shape in rearward direction.

It is advantageous in arranging a stepped tapering in the outer form of the dirigible to further construct the dirigible of the invention in such a manner that the hollow struts are connected inside the dirigible in the zone which extends from the nose to the stepped tapering with their inner ends at the suction port, while the struts which are provided behind the stepped tapering are connected to the center drive passageway. In this manner air is drawn from the outer skin of the dirigible in the area from the nose to the stepped tapering, while air is expelled at the outer skin of the dirigible in the area from the stepped tapering to the end of the dirigible. In this manner, particularly favorable flow conditions and a very small flow resistance are obtained.

The dirigible of the invention is advantageously also constructed in such a way that inside of the skin of the dirigible along the longitudinal axis of the dirigible there are provided several separate compartments which consist of a flexible material, which compartments can be filled or emptied independently from one another with or from a lifting gas, for example, helium. By selectively filling or emptying one or several of the compartments, the lift distribution along the longitudinal axis of the dirigible can be adjusted and thus the position of the dirigible can be controlled. This facilitates accurate trimming of the dirigible.

A further feature is that each compartment has a partial zone which is separated in a gastight manner from the remainder of the space within the compartment and which is surrounded by flexible walls, said zone being selectively fillable with air or air being dischargeable therefrom. The partial zone can thereby be connected to the atmosphere outside of the dirigible through a closable passage whereby an air pump is connected in the passage. Thus, it is made possible to selectively pump air into the partial zone of one or several compartments and to thus materially increase the weight of the contents of the compartments. This provides further control over the lift distribution and a trimming of the dirigible.

The construction of the compartment and its division through a flexible partition wall changeable in its effective length makes it possible in a particularly simple manner to change the weight of the dirigible for the purpose of controlling the lift. Whenever the dirigible is to have a maximum lift, the upper chambers of selected or all of the compartments are filled with a lighter-than-air gas of such an amount that same takes up the entirety of such compartment or compartments.

In this manner, the air, particularly pressure air, which is provided in the lower chambers of the compartments is pressed out and the lighter-than-air gas takes up the entire volume of the compartment. However, if the dirigible is to have a heavier specific weight in order to reduce its drive, then pressure air is forced into the lower chamber of the compartment. This reduces the volume of the upper chamber which is filled with lifting gas. The lighter-than-air gas can thereby, for example by means of pumps, be returned into storage pressure containers which are at the same time provided in a suitable number as reserve containers for the lifting gas. The pressure air entering the lower part of the compartment is relatively heavy so that, in addition at the same time provided the reduction of the amount of lighter-than-air gas in the upper chamber and the compressing thereof, a lift reduction occurs through the introduction of the relatively heavy pressure air. The pressure air is both withdrawn from the outside atmosphere and returned thereto through suitable compressors.

In order to replace drive motors during the flight of a dirigible, for example, with the help of a helicopter, the drive mechanisms can be installed and removed through a shaft extending vertically from above.

The dirigible of the invention is very sturdy and of light weight, due to its construction with the supporting longitudinal center girder which is constructed as a drive mechanism and the air-conducting hollow struts associated with the frames, whereby these elements preferably consist of glass fiber-shielded plastic or other light construction. The structural and technical expenditure in comparison to other types of aircraft is very low. The parts driving the dirigible are easily accessible and as discussed above, are replaceable even during the flight. Since the dirigible can also be steered when in standing condition, particularly through the control nozzles, independent from the change of the specific weight of the dirigible, a takeoff and landing without holding crews is possible. The concept of the invention makes it now possible to provide the dirigible also with landing gears, particularly retractable landing gears.

The invention is disclosed more in detail in the drawings in connection with one embodiment. The invention is not limited to the illustrated types of construction, instead, further modifications which lie within the scope of the invention are possible.

In the drawings:

FIG. 2 is a vertical cross-sectional view in the radial plane along line II—II OF FIG. 1;

FIG. 3 is a further cross-sectional view in the radial plane along the line II—II of FIG. 1;

FIG. 4 is a front elevational view of the tail in an illustration slightly enlarged with respect to FIG. 1;

FIG. 8 is a cross-sectional view in a radial plane of a partial zone of the body of the dirigible;

FIG. 9 is a cross-sectional view in a radial plane of a portion of the two-shelled outer skin of the dirigible;

FIG. 10 is a top view in a horizontal cross section of a portion of the dirigible;

FIG. 11 is a cross-sectional view of a hollow strut and of a circumferential frame with a two-shelled outer skin;

FIG. 12 is a radial cross-sectional view of the arrangement of FIG. 11;

FIG. 13 is an outside view of the arrangement of FIG. 12;

FIG. 14 is an outside view of the outer skin of FIG. 11;

FIG. 15 is a radial cross-sectional view of the body with a compartment;

FIG. 16 is a radial cross-sectional view of the compartment of FIG. 15 in a perspective illustration;

FIG. 17 is a vertical longitudinal cross-sectional view of the dirigible showing the devices for sucking or blowing out air provided in the outer skin for controlling the flow.

Figure 1:
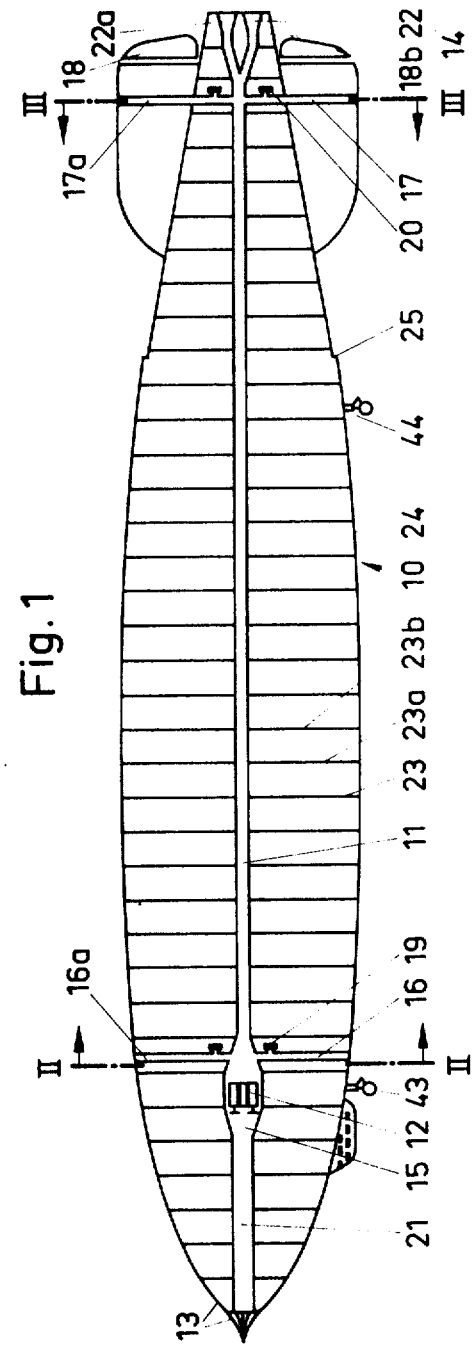
FIG. 1 is a vertical cross-sectional view of the center longitudinal axis of the dirigible.
Figure 6:
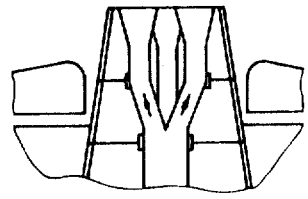
FIG. 6 illustrates the tail slightly enlarged with respect to FIG. 1.

The dirigible 10 comprises a through drive passageway 11 which extends from the nose to the tail and is open at both ends. Air is drawn in at the nose 13 of the dirigible and is expelled at the tail of the dirigible by means of one or more drive mechanisms 12 which can be constructed as a jet unit or which drive the propeller or air accelerators. The drive passageway has, in the direction of flight in front of the drive mechanisms 12 (or the drive mechanism 12 if only one is utilized as is particularly the case in blimps) a larger cross section than behind the drive mechanisms, said drive mechanism or mechanisms being arranged in such enlargement 15 of the drive passageway 11.

Radially from the drive passageway there are arranged air passageways 16 in a zone closely behind the drive mechanisms and air passageways 17 in the tail zone. As is particularly illustrated in FIGS. 2 and 3, four air passageways 16, 16a, 16b and 16c which are positioned at right angles to one another are provided closely behind the drive mechanisms (seen in normal direction of flight) and air passageways 17, 17a, 17b and 17c are provided in the tail unit. The air passageways 16 and 16a or 17 and 17a are vertically directed while the air passageways 16b and also 16c and 17b and 17c are horizontally directed. These air passageways have the purpose of controlling the dirigible in addition to the stabilizers, conventional elevators (not shown) and the rudders 18 and 18b, to maneuver or to steer the dirigible in the air if the speed of the dirigible is not sufficient to effect steering in the normal manner by the elevators and rudders. The air passageways 16 and 17 which act as jet openings at their outlet ends are supplied by the air stream in the drive passageway 11 of the dirigible. However, an auxiliary drive mechanism may be arranged to supply each air passageway 16, 16a, etc. and 17, 17a, etc., thus for example, air passageway 16 is associated with an auxiliary drive mechanism 19 and the air passageway 17 with an auxiliary drive mechanism 20. These auxiliary drive mechanisms will be sufficiently strong to assure a safe maneuvering of the dirigible even if the drive mechanism or drive mechanisms 12 fail.

FIG. 2 illustrates at 21 the passageway in front of the drives or the air inlet opening provided at the nose of the dirigible. At the tail of the dirigible, the drive passageway 11 divides into four single passageways, said single passageways extending parallel to one another for a short distance in order to form the funnel-shaped enlarged outlet nozzles 22, 22a, 22b and 22c, as illustrated in FIGS. 1 and 4.

The drive passageway 11 which extends along the center longitudinal axis of the dirigible over its entire length is of a self-supporting construction and thus acts as the keel of the dirigible. This center longitudinal support which is manufactured of glass fiber-shielded plastic, or in any lightweight metallic construction, contributes substantially to the light weight of the dirigible with great stability. Groups of struts 23, 23a, 23b, etc., originate at said center longitudinal support, said groups being spaced apart at suitable distances which correspond to the size of the dirigible. These groups of struts, in a dirigible having a length of approximately 200 meters, are spaced apart a distance of, for example, 3 meters. The groups of struts 23, 23a, 23b, etc., are also illustrated in FIG. 10 and FIG. 8 illustrates in a radial cross section one group of struts 23. The illustration shows that one group of struts which is arranged in a radial plane consists of a plurality of struts, namely, the struts 231, 232, 233, etc.

According to a further feature of the invention the struts are constructed as hollow struts which open to the outside atmosphere at their outer ends. As is evident from FIG. 17, those struts which are provided in the front and center portion of the dirigible are connected for good airflow at their inner ends to a suction port 46 which is connected to the suction end of the air impellers coupled with the drive mechanism 12. The suction port 46 is constructed as a passageway which extends concentrically to the drive passageway 11 (FIG. 17). The struts which are provided in the tail zone of the dirigible are connected in a good airflow manner at their inner ends to the center drive passageway 11.

FIGS 1 and 17 illustrate that the dirigible is provided in approximately the after 4/5's of its length with a flow-interrupting edge 25. Said flow-interrupting edge has as a step whose depth is approximately 2.75 percent of the larger diameter of the dirigible at this point. While the dirigible has a streamlined profile seen in normal direction of flight from said flow-interrupting edge, it has the shape of a cone in the zone behind said flow-interrupting edge, which cone is cut off at the tail. Thus, the shape of a truncated cone is obtained.

Air is drawn off the skin of the dirigible in the zone from the nose to the flow-interrupting edge 25 by the arrangement and air-conductive connection of the hollow struts 23 as illustrated in FIG. 17, while air is discharged in the tail zone behind the flow-interrupting edge. In this manner a particularly advantageous flow around the dirigible is obtained.

The group of struts 23, 23a, 23b, etc., wherein each group of struts is comprised of a plurality of struts 231, 232, 233, etc., is arranged in a fan-shaped manner in a radial plane and is arranged air-conductingly in front of the flow-interrupting edge 25, seen in normal direction of flight, so that the boundary layer air film is drawn in from the outer skin of the dirigible by said hollow struts. Such withdrawal of the boundary layer is done in such a manner that the air impellers which are coupled with the drive mechanisms 12 draw air in through the suction port and the hollow struts 23 (FIG. 17). The frictional resistance decreases considerably due to the drawing in of such boundary layer. However, air is not drawn in at the zone of the truncated cone and thus behind the flow-interrupting edge 25, instead air is fed to the outer layer from the drive passageway 11. This not only results in a flow of air which minimizes frictional resistance, but also provides an action component to assist the steering of the dirigible. In order to achieve this, measures are provided which can, for example, be flaps, valves or conduit means, generally indicated in 23F in FIG. 17 which are associated with the hollow struts and assure that, different from the zone in front of the flow-interrupting edge, air is delivered to the outside by the drive passageway while in front of the flow-interrupting edge air is withdrawn from the outer skin of the dirigible and is conducted away through the main drive passageway.

Figure 7:
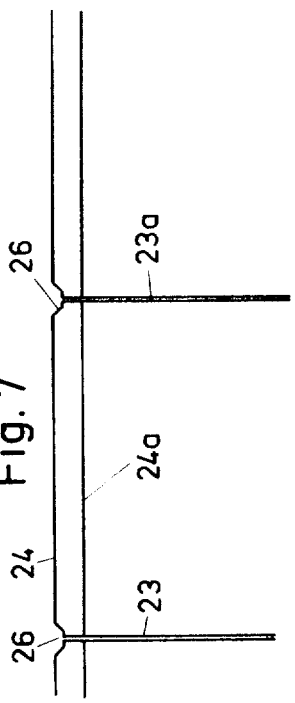
FIG. 7 is a vertical cross-sectional view of a partial zone of the body of the dirigible.

FIG. 7 illustrates substantially schematically the principle of the air suction on the outer skin 24 by means of groups of hollow struts 23 and 23a, etc. The outer liner 24 of the dirigible in this instance comprises two shells, the outer shell 24 and the inner shell 24a. Further shells may be added without departing from the principle of the invention. Each group of struts 23 or 23a is associated with annular recesses 26, 26a which are used to draw in air. However, said recesses 25, 26a, etc., are provided with louvered covers. This will be described in connection with FIGS. 11 to 14.

The groups of hollow struts 23, 23a, 23b, etc., open at their ends into circumferential frames 27, 27a, 27b, etc., which are schematically illustrated particularly in FIG. 10. (The suction passageway 43 is not illustrated in FIG. 10 in order to assure a clear understanding of the figure). In addition to said circumferential frames, longitudinal supports 28, 28a, etc., are provided which connect the struts in longitudinal direction of the dirigible. Auxiliary supports 29, 29a, etc., are provided as main supports between said longitudinal supports 28, 28a, etc. This is illustrated in FIG. 9. FIG. 9 also illustrates a possible aforementioned intermediate skin 24b between the outer shell 24 and the inner shell 24a.

FIG. 11 illustrates a strut 23 which opens into the circumferential frame 27. Said circumferential frame has the annular groove 26 which is covered with a thin plate 30. The plate 30 which is also illustrated from an outside view in FIG. 14 is provided with elongated openings 32, 32a, 32b, etc., which extend transversely to the direction of flight existing in the indicated arrow direction 31. Two such rows of openings 32 are arranged spaced apart in such a manner that they overlap as is illustrated in FIG. 14.

FIG. 13 is an outside view of the groove 26. Openings 33, 33a, 33b, etc., commence at the base of said groove, are tapered inwardly and open into a header 34 (FIG. 12) to which the hollow struts 23 are each connected. The cross sections of the connecting opening between the tapered passages 33 to the header 34 are not the same but change depending on the distance from the strut 23. Also, the header 34 extends over a section which corresponds to the distance between adjacent struts such that each strut opens into the header at the midpoint of each thereof. In order to obtain uniform flow resistances during drawing in of air through the outer channels 26, the tapered openings and the header 34, the funnels 33, 33a, 33b associated with a given header have a greater inlet cross section into the header 34 with an increasing distance away from the strut.

FIG. 12 illustrates the flow of the air drawn from the outer skin 24 of the dirigible into a strut 23 in direction of arrow 35. The arrow 35a illustrates the flow to the adjacent strut.

In order to maintain the lift of the dirigible, compartments 36 (FIG. 16) are arranged between the groups of struts 23, 23a, 23b, etc., which compartments are manufactured of any suitable substance, such as a plastic foil. FIG. 16 is a perspective illustration of such a compartment wherein the front wall is not illustrated. The compartments consist of cylindrical disks the thickness or depth of which correspond to the distance between the groups of struts 23 and 23a. It is also possible to choose less depth and thus to arrange serially several compartments between groups of struts. The compartments comprise a cylindrical center wall 37. Two walls 38, 39 originate at said center wall and extend at a small distance from each other. Thus, said walls define a slot to allow a compartment to be arranged embracing the main drive passageway 11 as illustrated in FIG. 15. A flexible partition wall 40 is arranged in the lower portion of a compartment. Said partition wall, (see FIG. 15) is longer than the diameter of the compartment. Thus, a compartment is divided into a lower and an upper chamber by said flexible partition which chambers can vary in volume according to the position of the flexible partition. Said upper chamber is filled with a lighter-than-air gas, particularly helium, through the filling tube 41. If a sufficient amount of helium is supplied under a sufficient pressure, the partition wall abuts the inner wall of the lower chamber and thus practically the entire compartment is filled with helium. The dirigible receives its maximum lifting force, if all remaining compartments are filled with helium in the same manner. However, if air is filled or flows, particularly if pumped as pressure air by a pump 42A and controlled by an openable and closable valve 42B, into the lower chamber through the filler tube 42, then the volume of the upper chamber which is filled with light gas is reduced and to the extent that the compartments are filled in the same manner with air in their respective lower chambers, the lifting force of the dirigible is reduced. The reduction in the lifting force can thereby be obtained either by compressing the light gas filling the upper chamber of the compartment, by returning the light gas into suitable pressure storage containers by means of a pump or by a combination of both measures. Furthermore, a reduction of the lift force is obtained through the amount of air introduced into the lower chambers. So far as this air is supplied to the lower chambers as pressure air, then the lift is not only reduced through the reduction in volume of the upper light gas chamber but also through the weight of the compressed air in the lower chamber of each compartment. The above-prescribed measure is not only provided to adjust the lifting force of the dirigible but also to trim the dirigible in such a manner that compartments in the zone of the nose of the dirigible have a different relationship between the light gas and the pressure air in both chambers than those in the tail of the dirigible. The air for filling the lower chamber of the compartments is drawn in from the outside atmosphere and also returned to the outside atmosphere.

The compartments can easily be replaced.

The compartments can alternatively, if desired, be constructed in such a manner that they contain therein a self-contained bubble of flexible material for filling with pressure air. In such case, said bubble is provided with an air passage leading to outside of the compartment.

The dirigible is controllable by the nozzles 16 and 17 even during a standstill and therefore does not require a ground crew during takeoff and landing. It therefore may be provided with retractable landing gears 43 and 44.

Figure 5:
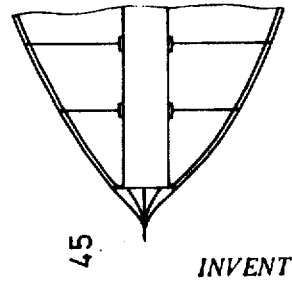
FIG. 5 is a cross-sectional view of the nose of the dirigible in an illustration slightly enlarged with respect to FIG. 1.

If the dirigible has landed and has been unloaded and is to remain at the loading zone for some time or if a strong wind is blowing, then the dirigible may drive itself to a mooring mast and may be secured to said mooring mast through a coupling 45 (FIG. 5) which is provided at the nose of the dirigible. Upon such mooring the landing gear 43 may be retracted. The two main landing gears 44 are pivotable about their vertical axes. Thus, if desired, such landing gear units may be released from their normal driving positions so that the dirigible, if resting on the ground and supported by such landing gear units, can swing around the mast and thus can rotate in the wind.

The dirigible of the invention can also fly backwards by means of reversing propellers.

The invention allows dirigibles which are not only safer than other types of aircraft but which are also more economical and are also much faster due to the favorable airflow control.

In case one drive mechanism of the dirigible should fail, or even if all drive mechanisms of the dirigible should fail, this does not mean that the dirigible will crash, but instead the dirigible will remain in the air. The dirigible maintains its maneuverability through the auxiliary drive mechanisms which are associated with the control air nozzles 16 and 17. Not all of the drives are likely to fail at the same time in practice because they are accessible and repairs can be made. Independent from this, it is provided that the drive motors can be replaced in a dirigible which is in the air. The drives, or at least one drive, is for this purpose arranged in a compartment which can be opened upwardly so that with the help of a helicopter, a new drive motor can be installed into the dirigible which is in the air.

Due to the two or multishell structure of the body skin the possibility now exists for guiding heat which is obtained through directing of the drives gases, and/or the exhaust gases of the drives, between the shells of the dirigible and thus protect the outer shell from freezing.

The dirigible of the invention fulfills the requirements of both good economy and of safety.

The embodiments of the invention in which an exclusive property or privilege is claimed are defined as follows:

1. A dirigible, comprising:
   means defining an elongated body;
   a plurality of mutually perpendicularly directed blast nozzles adjacent the forward and rearward portions of said elongated body means which open outwardly of said elongated body means, said blast nozzles being selectively operable independently of one another;
   means defining a drive passageway through the longitudinal center of said elongated body means between the nose and tail portions thereof and defining a supporting member, said drive passageway means being connected to provide air communication to said blast nozzles;
   at least one drive means being arranged in said drive passageway means, said drive means having suction port means adapted to draw air into one end of said drive passageway means and pressure port means adapted to discharge said air out of said other end, said suction port means including means defining a first passageway which extends concentrically of the drive passageway means along the length thereof a distance at least equal to the location of the largest diameter portion of said elongated body means;
   a plurality of hollow struts defining air passageways extending radially of said elongated body means and connected to said drive passageway means at the inner ends thereof, the outer ends of said air passageways each being open to the atmosphere, said radially extending hollow struts being grouped into selected radial planes spaced apart along the length of said drive passageway;
   said hollow struts including two groups of radial planes, a first group being longitudinally spaced over the front and center zone of said elongated body means, said first group being connected at their inner ends to said suction port means and said first passageway means to said drive means so that air is forcibly withdrawn from the front and center zone of said elongated body means, and said second group being longitudinally spaced over the rear zone of said elongated body means, said second group being connected at their inner ends in the zone adjacent the tail of said elongated body means to said pressure port means on said drive passageway means so that air is forcibly driven from said rear zone of said elongated body means whereby the pressure resistance developed at the front of said elongated body means is substantially reduced as same moves forwardly; and
   shell means forming the outer contour of said elongated body means having multiple longitudinal supports and circumferential frames, said circumferential frames being positioned in the radial planes of said hollow struts.

2. A dirigible according to claim 1, wherein the hollow struts are connected with the circumferential frames which have a groove extending around at least a portion of the outer surface of the elongated body means.

3. A dirigible according to claim 2, wherein the grooves extending around the circumferential frames are covered by perforated cover means.

4. A dirigible according to claim 3, wherein the perforations in the cover means are comprised of a chain of elongated openings, the longitudinal extension of which is transverse to the longitudinal axis of the elongated body means.

5. A dirigible according to claim 1, wherein the circumferential frames are provided on their outside with a groove extending therearound and that openings are provided which are tapered from the base of the groove, said grooves opening into a header into which said hollow struts open, whereby the header extends over a section corresponding to the distance between adjacent hollow struts.

6. A dirigible according to claim 1, wherein each of the hollow struts open respectively into the center of a header which extends over one section of said elongated body means and comprises tapered openings having a small cross section adjacent the hollow strut and increasing in cross section outwardly from the hollow strut.

7. A dirigible according to claim 1, including auxiliary drive means which drive impellers, for example propellers or axial compressors to supply pressurized air to said blast nozzles to steer said dirigible.

8. A dirigible according to claim 1, wherein said drive passageway means on one longitudinal end includes means dividing said drive passageway means into a plurality of separate passageways extending parallel to each other, the longitudinal ends of each of said parallel passageways being tapered.

9. A dirigible according to claim 1, wherein said rear zone on said elongated body means shortly before the tail unit comprises a stepped reduction in the diameter defining a flow-interrupting edge, the body portion adjacent the edge and extending rearwardly therefrom having a truncated conical shape.

10. A dirigible according to claim 1, wherein the depth of the stepped reduction in the diameter is approximately 2.75 percent of the larger diameter portion.

11. A dirigible according to claim 1, including means defining several separate compartments inside of the outer surface of the elongated body means along the longitudinal axis thereof, each of said compartments comprising an intermediate flexible wall to divide same into two subcompartments, one subcompartment containing a lifting gas and the other subcompartment being communicable with the atmosphere through a closable passage and a pump to permit a selective filling of said other subcompartment with air.

12. A dirigible according to claim 1, including tail landing gears pivotally secured to said elongated body means for movement about vertical axes.

13. A dirigible, comprising:
  means defining an elongated body having a nose and a tail unit;
  a plurality of mutually perpendicularly directed blast nozzles adjacent the forward and rearward portions of said elongated body means which open outwardly of said elongated body means, said blast nozzles being selectively operable independently of one another;
  means defining a drive passageway through the longitudinal center of said elongated body means between the nose and tail portions thereof;
  at least one drive means being arranged in said drive passageway means, said drive means having suction port means adapted to draw air into one end of said drive passageway means and pressure port means adapted to discharge said air out of said other end;
  a plurality of air passageways which open outwardly on said elongated body means along the length thereof;
  a plurality of first hollow struts interconnecting a first group of said air passageways to said suction port means to draw air into said first group of air passageways;
  a plurality of second hollow struts interconnecting a second group of said air passageways to said pressure port means to force air outwardly from said second group of said air passageways;
  a stepped reduction in the diameter of said elongated body means defining a flow-interrupting edge intermediate the nose and tail units, the body adjacent the stepped edge and extending rearwardly therefrom having a truncated conical shape, said first group of said air passageways being positioned frontwardly of said stepped edge and said second group of said air passageways being positioned rearwardly from said stepped edge.

14. A dirigible according to claim 13, including valve means for controlling the air flowing through said first and second hollow struts.

15. A dirigible according to claim 13, wherein said second group of air passageways includes means to direct the airflow rearwardly.

* * * * *